United States Patent
Fuse et al.

(10) Patent No.: US 8,196,946 B2
(45) Date of Patent: Jun. 12, 2012

(54) SUSPENSION STRUCTURE

(75) Inventors: Tomohiro Fuse, Wako (JP); Kazuhiko Gogo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/103,367

(22) Filed: Apr. 15, 2008

(65) Prior Publication Data

US 2008/0258420 A1 Oct. 23, 2008

(30) Foreign Application Priority Data

Apr. 20, 2007 (JP) ................................. 2007-111551

(51) Int. Cl.
    B62K 21/02 (2006.01)
(52) U.S. Cl. .................. 280/276; 280/124.179; 280/283
(58) Field of Classification Search .................. 280/283, 280/124.179, 276; 180/124, 179, 276; 267/34, 267/64.26, 226
See application file for complete search history.

(56) References Cited

U.S. PATENT DOCUMENTS

| | | | | |
|---|---|---|---|---|
| 5,582,395 A | * | 12/1996 | Cheng | 267/219 |
| 5,720,491 A | * | 2/1998 | Harper | 280/277 |
| 5,908,200 A | * | 6/1999 | Stewart | 280/276 |
| 6,105,988 A | * | 8/2000 | Turner et al. | 280/276 |
| 6,217,049 B1 | * | 4/2001 | Becker | 280/276 |
| 6,343,807 B1 | * | 2/2002 | Rathbun | 280/276 |
| 6,412,803 B1 | * | 7/2002 | Lalikyan et al. | 280/276 |
| 6,505,719 B2 | * | 1/2003 | Gonzalez et al. | 188/319.2 |
| 6,592,136 B2 | * | 7/2003 | Becker et al. | 280/276 |
| 6,607,185 B2 | * | 8/2003 | Graves et al. | 267/64.26 |
| 7,357,232 B2 | * | 4/2008 | Fujita | 188/297 |
| 2003/0071400 A1 | * | 4/2003 | Graves et al. | 267/140.11 |
| 2004/0036250 A1 | * | 2/2004 | Kofuji | 280/276 |
| 2004/0140644 A1 | * | 7/2004 | Kofuji et al. | 280/276 |
| 2005/0127636 A1 | * | 6/2005 | Czysz | 280/276 |

FOREIGN PATENT DOCUMENTS

JP     2000-145864 A     5/2000

* cited by examiner

*Primary Examiner* — Anne Marie Boehler
*Assistant Examiner* — Maurice Williams
(74) *Attorney, Agent, or Firm* — Westerman, Hattori, Daniels & Adrian, LLP

(57) ABSTRACT

A suspension structure includes a pair of right and left cushion units. The right cushion unit is constituted of a compression coil spring and a right damper, and the left cushion unit is constituted of only a left damper having an outer diameter smaller than a diameter of the compression coil spring and larger than a diameter of the right damper. The left cushion unit is constituted of only the left damper and does not include the compression coil spring and hence, the suspension structure can be simplified. Further, in the left cushion unit, the left damper does not slide relative to the compression coil spring in performing a stroke and hence, no friction is generated.

8 Claims, 6 Drawing Sheets

SUSPENSION STRUCTURE

TECHNICAL FIELD

The present invention relates to the improvement of a suspension structure.

BACKGROUND OF THE INVENTION

As the conventional suspension structure, there has been known a hydraulic shock absorber constituted of a suspension spring which converts vibrations and shocks propagated to wheels from a road surface into elastic energy to alleviate the vibrations and the shocks, and a damper which converts the elastic energy of the suspension spring into heat energy to damp the vibrations and the shocks of springs (for example, JP-A-2000-145864).

Hereinafter, the conventional suspension structure is explained.

A hydraulic shock absorber includes an outer tube mounted on a vehicle body side by way of an upper bracket and an under bracket, an inner tube slidably inserted into the inside of an outer tube and mounted on a wheel side by way of an axle bracket, and a suspension spring arranged between the outer tube and the inner tube. The outer tube and the inner tube constitute a portion of a damper device.

SUMMARY OF THE INVENTION

For example, to reduce the cost of a hydraulic shock absorber, simplification of the structure and reduction of the number of parts are considered. In supporting an axle using two hydraulic shock absorbers, provided that the hydraulic shock absorber possesses two functions, that is, a vibration-and-shock absorption function and a vibration-and-shock damping function, it is unnecessary to make two hydraulic shock absorbers have the same structure. Thus the simplification of the structure and the reduction of the number of parts is realized.

Further, when the above-mentioned hydraulic shock absorber is applied to a two-wheeled off-road vehicle, a long stroke becomes necessary for the hydraulic shock absorber. Accordingly, when the hydraulic shock absorber performs a stroke, the inner tube and the suspension spring are made to slide relative to each other, thus increasing a friction therebetween.

It is an object of the present invention to provide a suspension structure capable of suppressing the increase of a cost thereof and, at the same time, enhancing the operability thereof.

A first aspect of the invention comprises, in a suspension structure comprised of paired left-and-right first and second cushion units, the first cushion unit comprising a compression coil spring for alleviating vibrations and shocks and a first damper for damping vibrations and shocks, and the second cushion unit comprising a second damper having an outer diameter smaller than a diameter of the compression coil spring and larger than a diameter of the first damper for damping the vibrations and shocks.

In operation, the second cushion unit does not include the compression coil spring and hence, the structure of the second cushion unit can be simplified. Further, in the second cushion unit, the second damper does not slide relative to the compression coil spring in performing the stroke and hence, a friction is not generated.

In a second aspect of the invention, the second cushion unit includes a caliper bracket mounted on a brake caliper which constitutes a disc brake.

In operation, the second cushion unit increases the weight thereof by an amount corresponding to the weight of the caliper bracket and hence, the weight of the second cushion unit approximates a weight of the first cushion unit including the compression coil spring and the first damper.

Accordingly, it is possible to acquire the favorable weight balance in the lateral direction.

In a third aspect of the invention, the first and second cushion units are connected to each other by a top bridge and a bottom bridge thus constituting a front fork, the front fork is steerably supported on a vehicle body, and in both of first and second cushion units, an outer diameter of the upper support portion supported on the top bridge and an outer diameter of the lower support portion supported on the bottom bridge are different from each other.

In operation, by making the outer diameter of the upper support portion supported on the top bridge and the outer diameter of the lower support portion supported on the bottom bridge different from each other in both of the first and second cushion units, it is possible to change the moduli of rupture of both of the first and second cushion units respectively in the longitudinal direction.

In a fourth aspect of the invention, the first and second cushion units are connected to each other by the top bridge and the bottom bridge thus constituting the front fork, the front fork is steerably supported on a vehicle body side, and an outer diameter of the upper support portion of the first cushion unit supported on the top bridge and an outer diameter of the upper support portion of the second cushion unit supported on the top bridge are made different from each other, and an outer diameter of the lower support portion of the first cushion unit supported on the bottom bridge and an outer diameter of the lower support portion of the second cushion unit supported on the bottom bridge are different from each other.

In operation, by making the outer diameter of the upper support portion of the first cushion unit supported on the top bridge and the outer diameter of the upper support portion of the second cushion unit supported on the top bridge different from each other, and by making the outer diameter of the lower support portion of the first cushion unit supported on the bottom bridge and the outer diameter of the lower support portion of the second cushion unit supported on the bottom bridge different from each other, it is possible to make the modulus of rupture of the first cushion unit and the modulus of rupture of the second cushion unit different from each other.

According to a first aspect of the invention, the suspension structure includes paired left-and-right first and second cushion units, the first cushion unit comprises the compression coil spring and the first damper, and the second cushion unit comprises the second damper having the outer diameter smaller than the diameter of the compression coil spring and larger than the diameter of the first damper. Since the second cushion unit does not include a compression coil spring, the structure of the suspension can be simplified whereby the suspension structure can be manufactured at a low cost, thus suppressing the increase of cost.

Further, the compression coil spring is not mounted on the second cushion unit and hence, it is possible to reduce a friction of the second cushion unit thus enhancing the operability of the second cushion unit.

According to a second aspect of the invention, the second cushion unit includes the caliper bracket mounted on the brake caliper which constitutes the disc brake and hence, the weight of the second cushion unit is increased by an amount corresponding to a weight of the caliper bracket. Accordingly, it is possible to approximate the weight of the second cushion unit to the weight of the first cushion unit and hence, a weight balance between the first and second cushion units can be enhanced.

According to a third aspect of the invention, the first and second cushion units are joined to each other using the top bridge and the bottom bridge to form the front fork, the front fork is steerably supported on the vehicle body, and in both of first and second cushion units, the outer diameter of the upper support portion supported on the top bridge and the outer diameter of the lower support portion supported on the bottom bridge are different from each other. Accordingly, for example, by making moduli of rupture in the longitudinal direction of both first and second cushion units different from each other, it is possible to enhance the balance of the modulus of rupture between the first and second cushion units.

According to a fourth aspect of the invention, the first and second cushion units are connected to each other by the top bridge and the bottom bridge thus constituting the front fork, the front fork is steerably supported on a vehicle body side, and an outer diameter of the upper support portion of the first cushion unit supported on the top bridge and an outer diameter of the upper support portion of the second cushion unit supported on the top bridge are made different from each other, and the outer diameter of the lower support portion of the first cushion unit supported on the bottom bridge and the outer diameter of the lower support portion of the second cushion unit supported on the bottom bridge are different from each other. Accordingly, for example, the modulus of rupture of the cushion unit having a smaller modulus of rupture among the first and second cushion units can be enhanced by increasing the outer diameter of the upper support portion supported on the top bridge and the outer diameter of the lower support portion supported on the bottom bridge of the cushion unit, respectively, thus approximating the modulus of rupture of the cushion unit having the smaller modulus of rupture to the modulus of rupture of the cushion unit having a larger modulus of rupture, whereby the balance of the modulus of rupture between the first and second cushion units can be enhanced.

BRIEF DESCRIPTION OF THE DRAWINGS

The advantages of the invention will become apparent in the following description taken in conjunction with the drawings, wherein.

DETAILED DESCRIPTION OF THE INVENTION

The present invention is explained in conjunction with attached drawings hereinafter. Here, the drawings are viewed in the direction of numerals.

Figure 1:
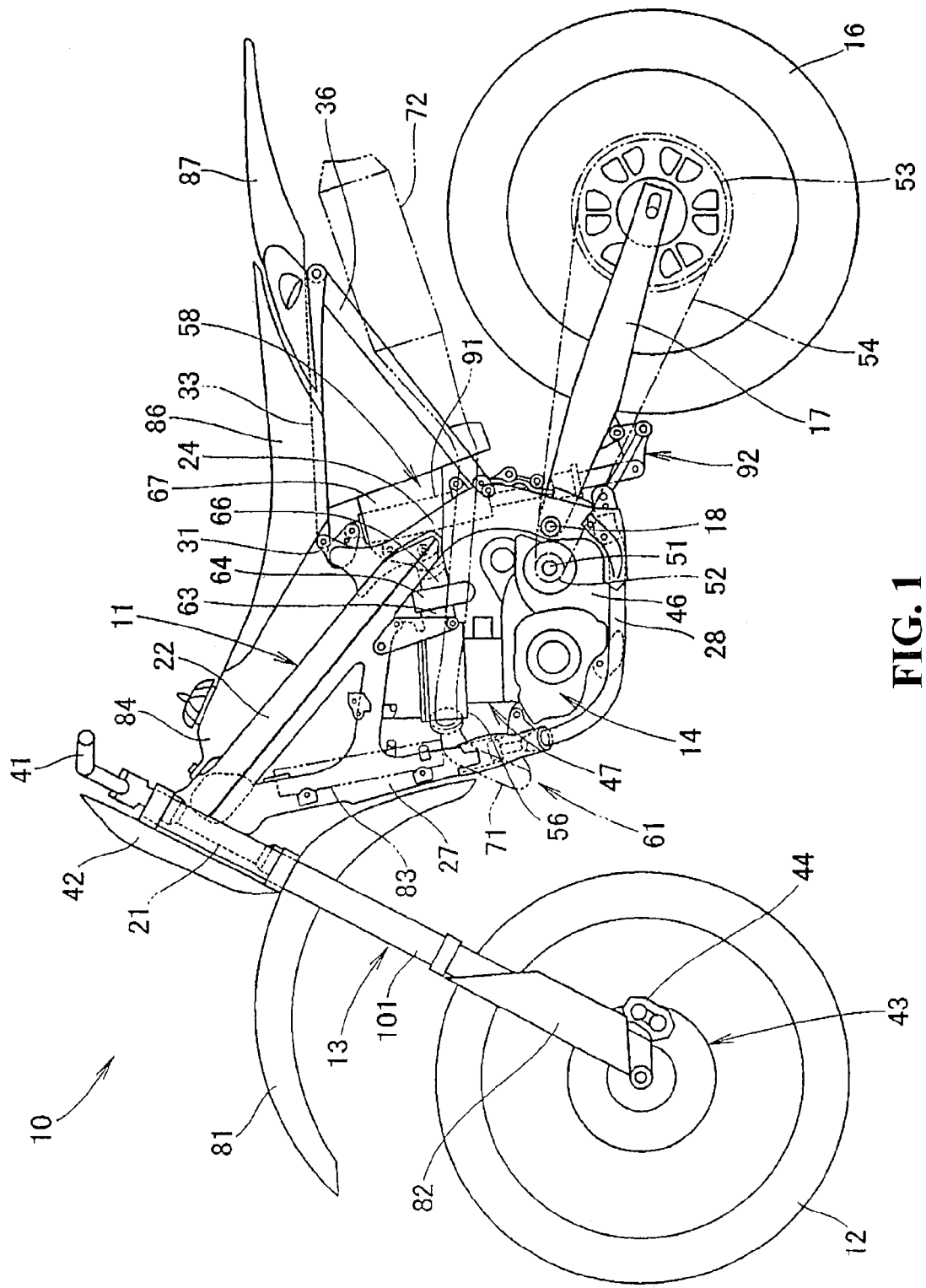
FIG. 1 is a side view of a vehicle including the suspension structure according to the present invention.

FIG. 1 is a side view of a vehicle having the suspension structure according to the present invention. In FIG. 1, the vehicle 10 is configured such that a front fork 13, which supports a front wheel 12, is steerably mounted on a front end portion of a vehicle body frame 11, an engine 14 is arranged at a center portion of the vehicle body frame 11, and a rear fork 17, which supports a rear wheel 16, is mounted on a lower rear portion of the vehicle body frame 11 via a pivot shaft 18 in a vertically swingable manner.

The vehicle body frame 11 is constituted of a head pipe 21 arranged at a front end of the vehicle body frame 11 and having a front fork 13 rotatably mounted thereon, a pair of left and right main frames 22, 23 (showing only the left main frame 22) extending obliquely in the rearward and downward direction from the head pipe 21, a pair of left and right pivot plates 24, 26 (showing only the left pivot plate 24) respectively extending downwardly from rear ends of the main frames 22, 23, a down frame 27 extending downwardly from the head pipe 21, a pair of left and right lower frames 28, 29 respectively connecting the down frame 27 and the left and right pivot plates 24, 26, a pair of left and right seat rails 33, 34 (showing only left seat rail 33) extending rearwardly from upper brackets 31, 32 (showing only the left upper bracket 31) respectively mounted on upper ends of the pivot plates 24, 26, and a pair of left and right sub-frames 36, 37 (showing only the left sub-frame 36) respectively extending between rear ends of the seat rails 33, 34 and intermediate portions of the pivot plates 24, 26.

A bar handle 41 is mounted on an upper portion of the front fork 13, a number plate 42 is mounted on a front portion of the front fork 13, and a brake caliper 44 which constitutes a disc brake 43 is mounted on a lower portion of the front fork 13.

A transmission 46 is integrally mounted on a rear portion of the engine 14, and a cylinder portion 47 extending upwardly is mounted on a front portion of the engine 14.

An output shaft 51 is mounted on a side portion of the transmission, a drive sprocket wheel 52 is mounted on the output shaft 51, and a chain 54 is wound around the drive sprocket wheel 52 as well as a driven sprocket wheel 53 integrally mounted on the rear wheel 16.

The cylinder portion 47 includes a cylinder head 56, an intake device 58 connected to a rear portion of the cylinder head 56, and an exhaust device 61 connected to a front portion of the cylinder head 56.

The intake device 58 is constituted of an intake pipe 63 connected to the cylinder head 56, a throttle body 64 connected to the intake pipe 63, and an air cleaner 67 connected to the throttle body 64 by way of a connecting tube 66.

The exhaust device 61 is constituted of an exhaust pipe 71 having one end thereof connected to the cylinder head 56, and a muffler 72 connected to another end of the exhaust pipe 71.

Here, numeral 81 indicates a front fender, numeral 82 indicates a protector covering a lower front portion of the front fork 13, numeral 83 indicates a radiator, numeral 84 indicates a fuel tank, numeral 86 indicates a seat, numeral 87 indicates a rear fender, and a numeral 91 indicates a rear cushion unit having an upper end thereof connected to the upper brackets 31, 32 side and a lower end thereof joined to the rear fork 17 and pivot plates 24, 26 sides by way of a link mechanism 92.

Figure 2:
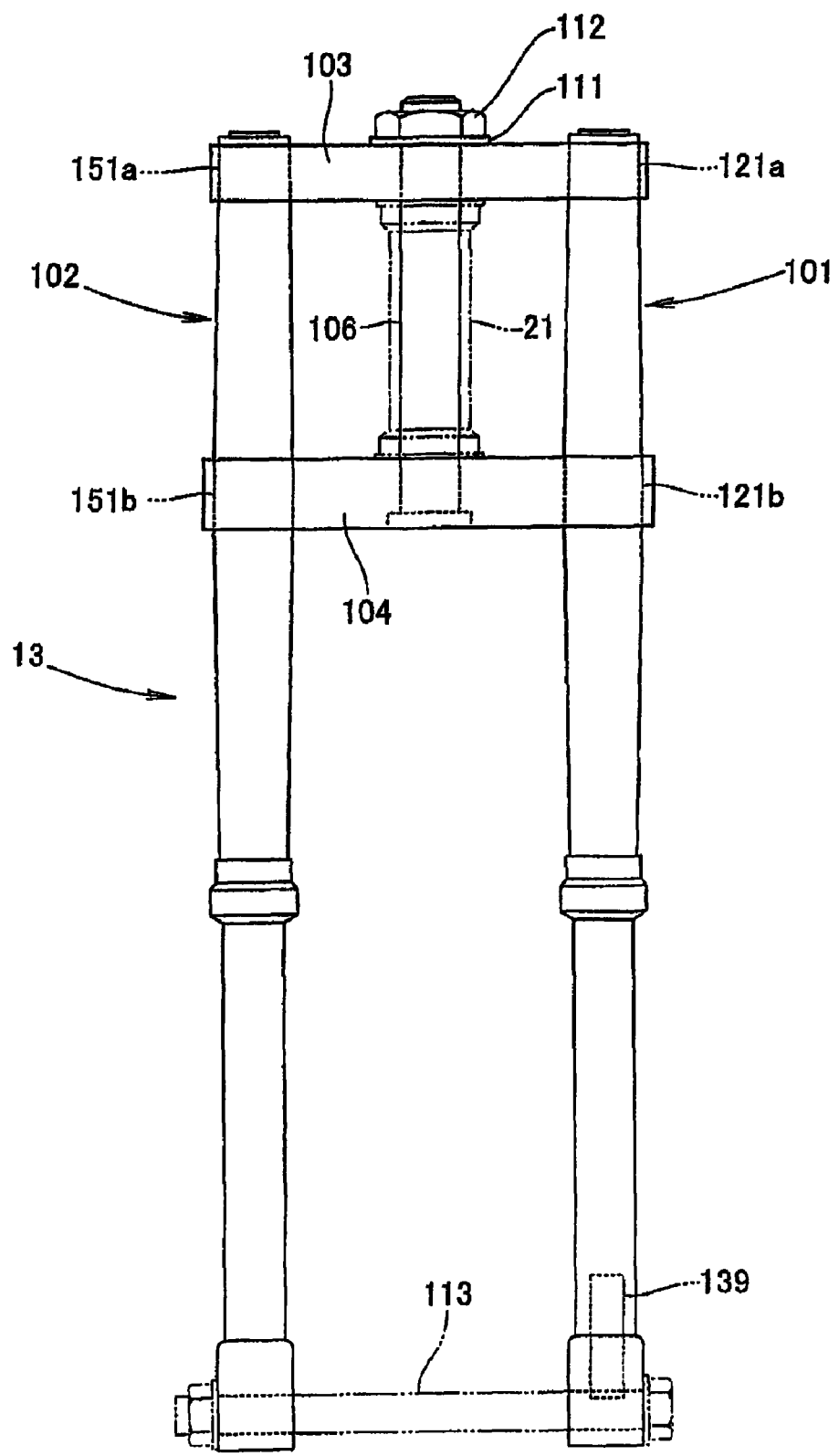
FIG. 2 is a front view of a front fork according to the present invention.

FIG. 2 is a front view of the front fork according to the present invention. The front fork 13 is constituted of a left cushion unit 101, a right cushion unit 102, a top bridge 103 and a bottom bridge 104, which respectively connect the left cushion unit 101 and the right cushion unit 102, and a steering stem 106 which is mounted on center portions of the respective top bridge 103 and bottom bridge 104. The steering stem 106 is rotatably mounted on the head pipe 21. Here, numerals 111 and 112 indicate a washer and a nut for fixing the steering stem 106 to the top bridge 103, respectively, and numeral 113 indicates a front-wheel-use axle.

The above-mentioned left cushion unit 101 and right cushion unit 102 are made different from each other with respect to at least the internal structure and a portion for supporting the front-wheel-use axle 113. The detailed structure of the left and right cushion units 101, 102 is explained hereinafter in conjunction with FIG. 3 and FIG. 4.

Figure 3A:
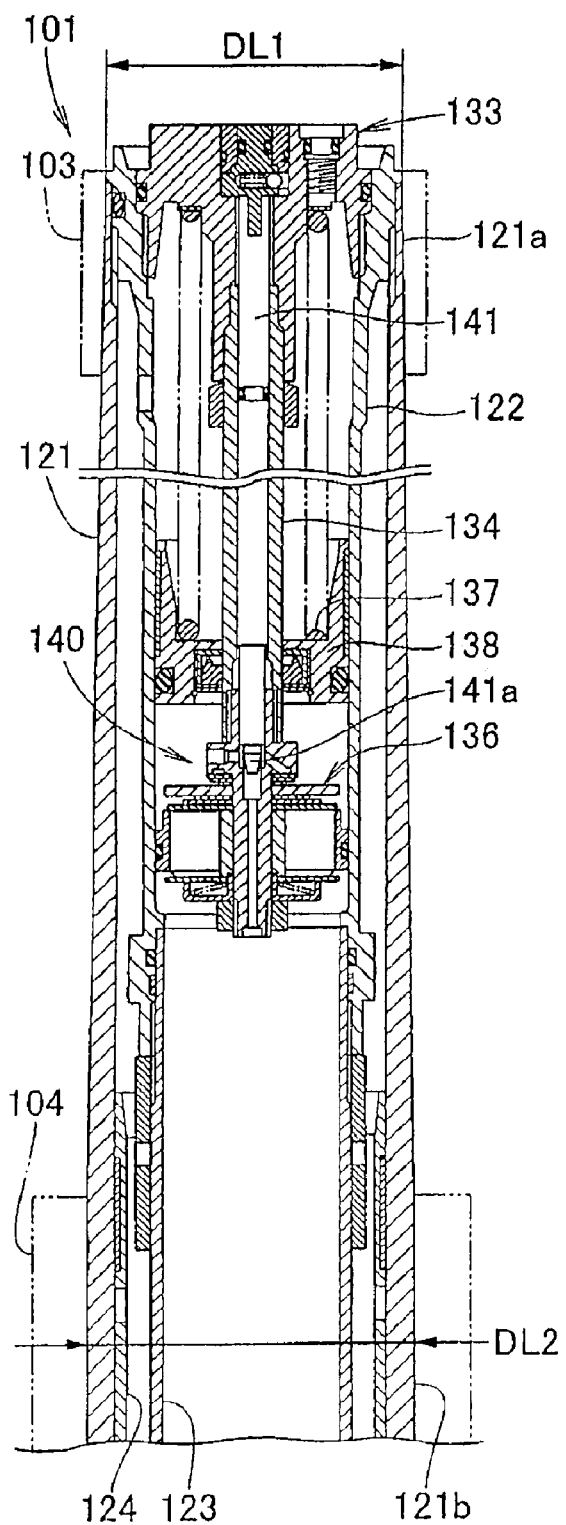
FIGS. 3(a) and 3(b) are cross-sectional views of a left cushion unit according to the present invention.
Figure 3B:
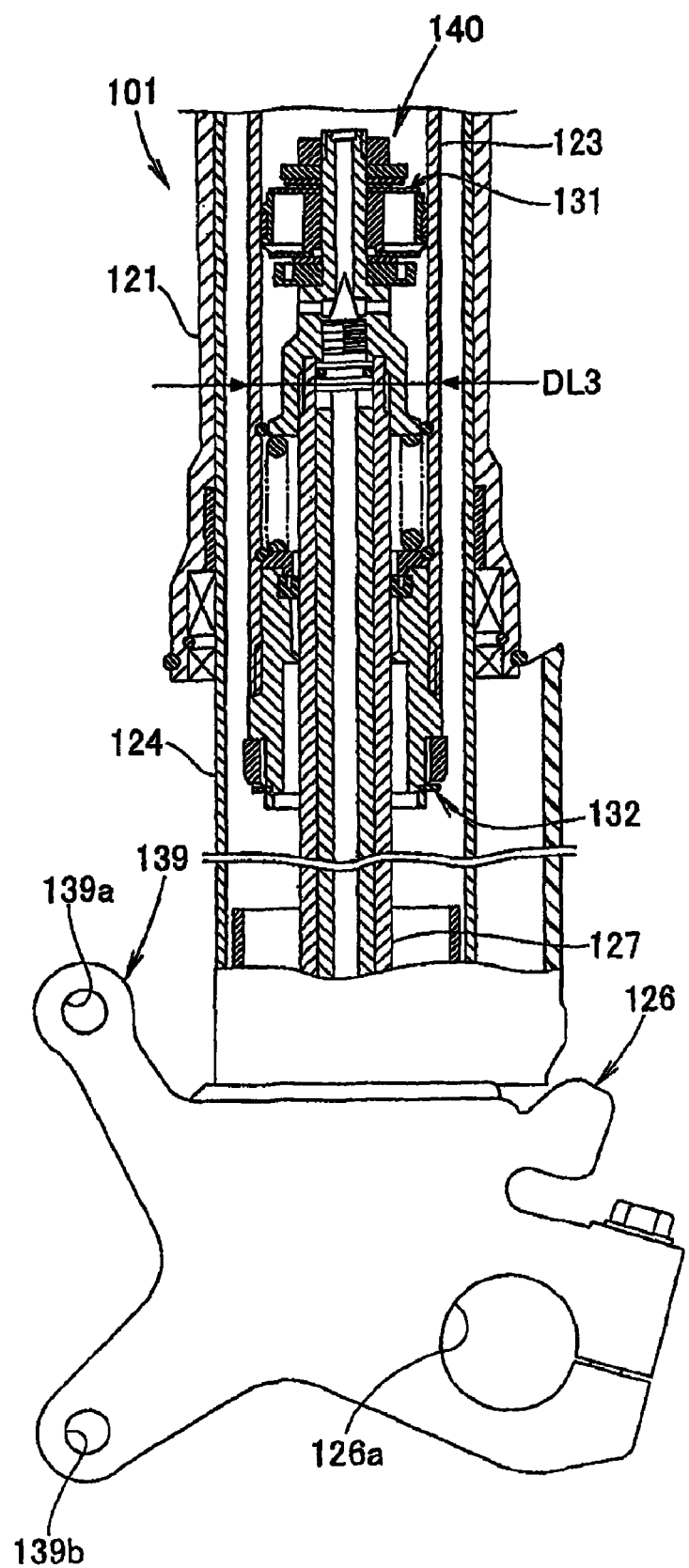

FIG. 3(a) and FIG. 3(b) are cross-sectional views of the left cushion unit according to the present invention, wherein FIG. 3(a) shows an upper portion of the left cushion unit 101, and FIG. 3(b) shows a lower portion of the left cushion unit 101.

In FIG. 3(a) and FIG. 3(b), the left cushion unit 101 is of an inverted type, and includes an outer tube 121 mounted on an upper portion of the left cushion unit 101, an upper tube 122 joined to an inner surface of an upper end portion of the outer tube 121 by threaded engagement and arranged inside the outer tube 121, a lower tube 123 mounted on a lower portion of the upper tube 122, an inner tube 124 movably fitted in the outer tube 121 and extending downwardly from the outer tube 121, an axle support portion 126 mounted on a lower end of the inner tube 124 for supporting the front-wheel-use axle 113 (see FIG. 2), a hollow inner rod 127 having a lower end thereof mounted on the axle support portion 126 and extending upwardly, a piston 131 mounted on an upper end of the hollow inner rod 127 and slidably arranged in the inside of the lower tube 123, a lower shaft sealing member 132 sealing a lower end portion of the lower tube 123, an upper shaft sealing member 133 joined to an inner surface of an upper end portion of the upper tube 122 by threaded engagement and sealing an upper end portion of the upper tube 122, a hollow upper rod 134 extending downwardly from the upper shaft sealing member 133, an upper sub-piston 136 mounted on a lower end of the hollow upper rod 134, a floating piston 138 movably fitted in the hollow upper rod 134 and biased by a compression coil spring 137, and a working oil (not shown in the drawing) filled in the inside of the left cushion unit 101.

The axle support portion 126 is integrally formed with a caliper bracket 139 which constitutes the brake caliper 44 (see FIG. 1). Here, numeral 126a indicates an axle insertion hole formed in the axle support portion 126 for allowing the front-wheel-use axle 113 to pass therethrough, and numerals 139a, 139b indicate mounting holes formed in the caliper bracket 139 for mounting the caliper body (not shown in the drawing) which constitutes the brake caliper 44 on the caliper bracket 139.

In the above-mentioned left cushion unit 101, portions except for the outer tube 121 and the inner tube 124, that is, portions which generate a compression-side damping force or an extending-side damping force due to the piston 131, the upper sub piston 136, the floating piston 138 and a damping-force adjusting rod 141 (explained in detail later) constitute a left damper 140.

That is, the left cushion unit 101 does not include a compression coil spring for alleviating the vibrations and the shocks arranged between the outer tube 121 side and the inner tube 124 side.

An outer diameter of a cylindrical left upper fitting portion 121a of the outer tube 121 constituting a portion fitted on the top bridge 103 is expressed as DL1 and an outer diameter of a cylindrical left lower fitting portion 121b of the outer tube 121 constituting a portion fitted on the bottom bridge 104 is expressed as DL2, and a relationship of DL1<DL2 is established. The outer diameter of the outer tube 121 is gradually increased from the left upper fitting portion 121a to the left lower fitting portion 121b forming the outer tube 121 in a tapered shape, and the outer diameter of the outer tube 121 is also gradually decreased from the left lower fitting portion 121b to the lower end of the outer tube 121 forming the outer tube 121 in a tapered shape. Here, in the drawing, symbol DL3 indicates an outer diameter of the lower tube 123.

In the drawing, the left cushion unit 101 is in a full extended state. When the left cushion unit 101 is compressed from such a state, the piston 131 is elevated relative to the lower tube 123 and a compression-side leaf valve of the piston 131 is opened by the working oil. When the leaf valve is opened, a compression-side damping force is generated. Here, the inner rod 127 advances toward the inside of the lower tube 123 and hence, the working oil in the inside of the lower tube 123 opens a compression-side leaf valve of the upper sub-piston 136 by an amount corresponding to a volume of an advanced portion of the inner rod 127, passes the leaf valve, and flows into the inside of the upper tube 122, thus moving the floating piston 138 upwardly. Accordingly, a compression-side damping force is also generated due to such an operation.

Further, when the compressed left cushion unit 101 extends, the piston 131 is lowered relative to the lower tube 123 and an extending-side leaf valve of the piston 131 is opened by the working oil and hence, the extending-side damping force is generated. Here, since the inner rod 127 is retracted from the inside of the lower tube 123, the working oil in the inside of the upper tube 122 opens the extending-side leaf valve of the upper sub-piston 136 by an amount corresponding to a volume of a retracted portion of the inner rod 127, passes the leaf valve, and flows into the inside of the lower tube 123, thus moving the floating piston 138 downwardly. Accordingly, the extending-side damping force is also generated due to such an operation.

Further, in the left cushion unit 101, the damping force adjusting rod 141 is arranged in the inside of the upper shaft sealing member 133 and the upper rod 134 in a rotatable manner as well as in a vertically movable manner. By rotating the damping-force adjusting rod 141, a needle valve 141a mounted on a distal end of the damping-force adjusting rod 141 moves upwardly and downwardly in a flow passage of the working oil to change a cross-sectional area of the flow passage. When the left cushion unit 101 is extended or retracted, a flow rate of the working oil passing through the upper sub-piston 136 is controlled and hence, the damping force is adjusted.

According to the present invention, the caliper bracket 139 mounted on the brake caliper 44 (see FIG. 1) constituting the disc brake 43 (see FIG. 1) is provided to the left cushion unit 101. Accordingly, a weight of the left cushion unit 101 constituted of only the left damper 140 is increased by an amount corresponding to a weight of the caliper bracket 139. Accordingly, it is possible to approximate the weight of the left cushion unit 101 to a weight of the right cushion unit 102 thus enhancing a weight balance between the right cushion unit 102 and the left cushion unit 101.

Figure 4A:
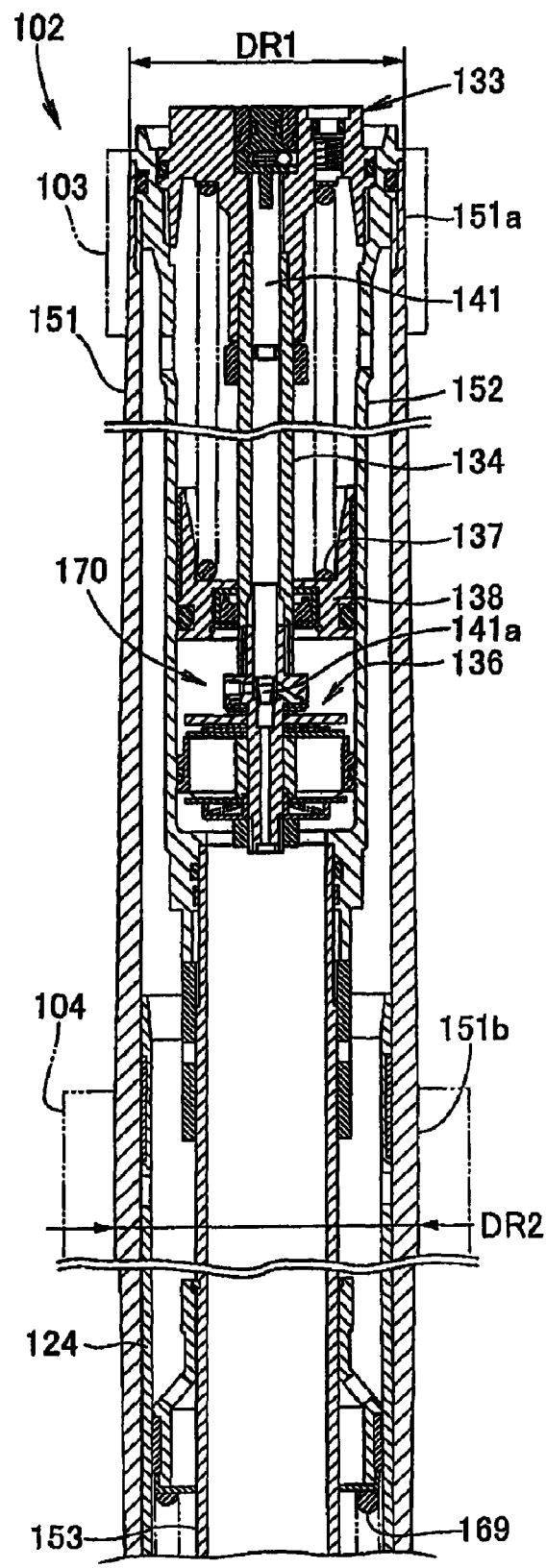
FIGS. 4(a) and 4(b) are cross-sectional views of a right cushion unit according to the present invention.
Figure 4B:
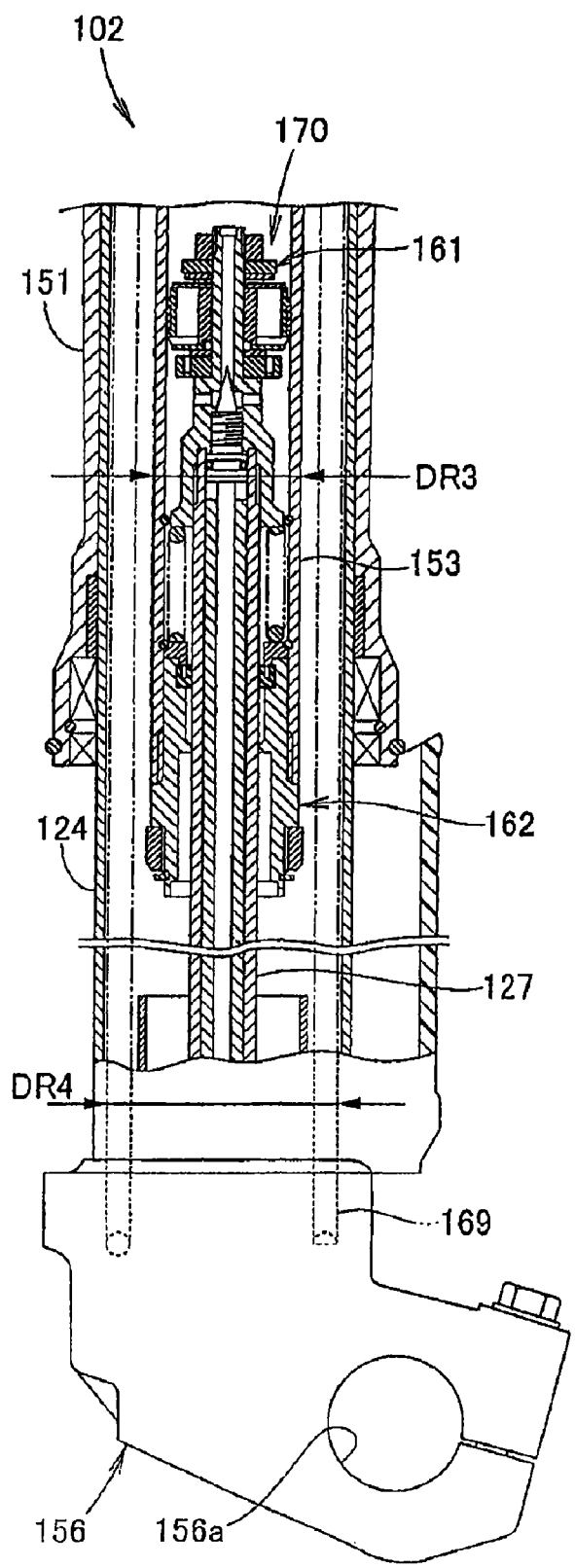

FIG. 4(a) and FIG. 4(b) are cross-sectional views of the right cushion unit according to the present invention, wherein FIG. 4(a) shows an upper portion of the right cushion unit 102 and FIG. 4(b) shows a lower portion of the right cushion unit 102. Constitutions identical with the corresponding constitutions of the left cushion unit 101 shown in FIG. 3(a) and FIG. 3(b) are given the same symbols and their detailed explanation is omitted.

In FIG. 4(a) and FIG. 4(b), the right cushion unit 102 is a hydraulic buffer of an inverted type and includes an outer tube 151 mounted on an upper portion of the right cushion unit 102, an upper tube 152 joined to an inner surface of an upper end portion of the outer tube 151 by threaded engagement and arranged inside the outer tube 151, a lower tube 153 mounted on a lower portion of the upper tube 152, an inner tube 124 movably fitted in the outer tube 151 and extending downwardly from the outer tube 151, an axle support portion 156 mounted on a lower end of the inner tube 124 for supporting the front-wheel-use axle 113 (see FIG. 2), a hollow inner rod 127 having a lower end thereof mounted on the axle support portion 156 and extending upwardly, a piston 161 mounted on an upper end of the inner rod 127 and slidably arranged in the inside of the lower tube 153, a lower shaft sealing member 162 sealing a lower end portion of the lower tube 153, an upper shaft sealing member 133 joined to an inner surface of an upper end portion of the upper tube 152 by threaded engagement and closing an upper end portion of the upper tube 152, an upper rod 134, an upper sub-piston 136, a floating piston 138, a compression coil spring 169 having one end thereof supported on the lower tube 153 and having another end thereof supported on the axle support portion 156, and a working oil (not shown in the drawing) filled in the inside of the right cushion unit 102. Here, numeral 156a indicates an axle insertion hole formed in the axle support portion 156 for allowing the front-wheel-use axle 113 to pass therethrough.

That is, the right cushion unit 102 includes a compression coil spring 169 extending between an outer-tube-151 side and an inner-tube-124 side, and portions except for the outer tube 151, the inner tube 124 and the compression coil spring 169. A right damper 170 is constituted of portions for generating a compression-side damping force or an extending-side damping force due to the piston 161, the upper sub piston 136, the floating piston 138 and the damping-force adjusting rod 141.

An outer diameter of a cylindrical right upper fitting portion 151a of the outer tube 151 constituting a portion fitted on the top bridge 103 is expressed as DR1 and an outer diameter of a cylindrical right lower fitting portion 151b of the outer tube 151 constituting a portion fitted on the bottom bridge 104 is expressed as DR2, and a relationship of DR2>DR1 is established. The outer diameter of the outer tube 151 is gradually increased from the right upper fitting portion 151a to the right lower fitting portion 151b forming the outer tube 151 in a tapered shape, and the outer diameter of the outer tube 151 is also gradually decreased from the right lower fitting portion 151b to the lower end of the outer tube 151 forming the outer tube 151 in a tapered shape.

Further, to compare the outer diameter DL1 of the left upper fitting portion 121a and the outer diameter DL2 of the left lower fitting portion 121b of the outer tube 121 shown in FIG. 3(a) with the above-mentioned outer diameters DR1, DR2 respectively, relationships of DL1=DR1, DL2=DR2 are established.

Further, for example, for setting the modulus of rupture of the left cushion unit 101 larger than modulus of rupture of the right cushion unit 102, the relationship of DL1>DR1 and the relationship of DL2>DR2 are adopted. For setting the modulus of rupture of the right cushion unit 102 larger than the modulus of rupture of the left cushion unit 101, the relationship of DR1>DL1 and the relationship of DR2>DL2 are adopted.

Symbol DR3 in the drawing indicates an outer diameter of the lower tube 153, symbol DR4 indicates an outer diameter of the compression coil spring 169. To compare the outer diameter DL3 of the lower tube 123 shown in FIG. 3 with the outer diameter DR3 of the lower tube 153, the relationship of DL3>DR3 is established. Further, the relationship between the outer diameter DL3 and the outer diameter DR4 of the compression coil spring 169 is set to DL3≦DR4. Still further, the relationship between the outer diameter DL3 and the outer diameter DR3 is set to DL3>DR3.

As described above, the left cushion unit 101 does not include a compression coil spring and hence, the outer diameter of the left damper 140, for example, the outer diameter DL3 of the lower tube 123 is set larger than the outer diameter of the right damper 170, for example, the outer diameter DR3 of the lower tube 153. To be more specific, the outer diameter of the left damper 140 can be increased up to the outer diameter DR4 of the compression coil spring 169 and hence, it is possible to set the damping force of the left damper 140 larger than the damping force of the right damper 170.

In the drawing, the right cushion unit 102 is in a fully extended state. When the right cushion unit 102 is compressed from such a state, the piston 161 is elevated relative to the lower tube 153 and a compression-side leaf valve of the piston 161 is opened by the working oil. When the leaf valve is opened, the compression-side damping force is generated. Here, since the inner rod 127 advances toward the inside of the lower tube 153, the working oil in the inside of the lower tube 153 opens a compression-side leaf valve of the upper sub-piston 136, passes the leaf valve, and flows into the inside of the upper tube 152 by an amount corresponding to a volume of an advanced portion of the inner rod 127, thus moving the floating piston 138 upwardly. Accordingly, a compression-side damping force is also generated due to such an operation.

Further, when the compressed right cushion unit 102 extends, the piston 161 is lowered relative to the lower tube 153. When an extending-side leaf valve of the piston 161 is opened by the working oil, the extending-side damping force is generated. Here, since the inner rod 127 is retracted from the inside of the lower tube 153, the working oil in the inside of the upper tube 152 opens the extending-side leaf valve of the upper sub-piston 136, passes the leaf valve, and flows into the inside of the lower tube 153 by an amount corresponding to a volume of a retracted portion of the inner rod 127, thus moving the floating piston 138 downwardly. Accordingly, the extending-side damping force is also generated due to such an operation.

Further, in the right cushion unit 102, the damping force can be adjusted by rotating the damping force adjusting rod 141 in the same manner as the left cushion unit 101.

As explained heretofore in conjunction with FIG. 3 and FIG. 4, the present invention is directed to a suspension structure which includes the right cushion unit 102 and the left cushion unit 101 as the pair of right-and-left cushion units, wherein the right cushion unit 102 is constituted of the compression coil spring 169 and the right damper 170 forming the first damper, and the left cushion unit 101 is constituted of only the left damper 140 having the outer diameter DL3 substantially equal to or smaller than the outer diameter DR4 of the compression coil spring 169 and larger than the outer diameter DR3 of the right damper 170. Since the left cushion unit 101 is constituted of only the left damper 140, the structure of the suspension can be simplified and hence, the suspension structure can be manufactured at a low cost thus suppressing the increase of cost.

Further, the compression coil spring is not provided to the left cushion unit 101 and hence, it is possible to reduce a friction of the left cushion unit 101 thus enhancing the operability of the left cushion unit 101.

In the present invention, the right cushion unit 102 and the left cushion unit 101 are joined to each other using the top bridge 103 and the bottom bridge 104 to form the front fork 13. The front fork 13 is steerably supported on the vehicle body, and the outer diameter of the right upper fitting portion 151a constituting the upper support portion supported on the top bridge 103 and the outer diameter of the right lower fitting portion 151b constituting the lower support portion supported on the bottom bridge 104 are made different from each other. The outer diameter of the left upper fitting portion 121a constituting the upper support portion supported on the top bridge 103 and the outer diameter of the left lower fitting portion 121b constituting the lower support portion supported on the bottom bridge 104 are made different from each other. For example, by making the respective moduli of rupture in the longitudinal direction of both the right cushion unit 102 and the left cushion unit 101 different from each other, it is possible to enhance the balance of modulus of rupture between the right cushion unit 102 and the left cushion unit 101.

Further, in the present invention, the right cushion unit 102 and the left cushion unit 101 are joined to each other using the top bridge 103 and the bottom bridge 104 thus constituting the front fork 13. The front fork 13 is steerably supported on a vehicle body side, and the outer diameters of the right upper fitting portion 151a and the left upper fitting portion 121a of the right and left right cushion units 102, 101 supported on the top bridge 103, respectively, are different from each other. The outer diameters of the right lower fitting portion 151b and the left lower fitting portion 121b of the right and left cushion units 102, 101 supported on the bottom bridge 104, respectively, are made different from each other. Accordingly, for example, the modulus of rupture of the cushion unit having a smaller modulus of rupture among the right and left cushion units 102, 101 can be increased by increasing the outer diameter of the right upper fitting portion 151a or the left upper fitting portion 121a of the right or left cushion unit 102, 101 supported on the top bridge 103, and increasing the outer diameter of the right lower fitting portion 151b or the left lower fitting portion 121b of the right or left cushion unit 102, 101 supported on the bottom bridge of the cushion unit, thus approximating the modulus of rupture of the cushion unit having the smaller modulus of rupture to the modulus of rupture of the cushion unit having a higher modulus of rupture, whereby the balance of the modulus of rupture between the right cushion unit 102 and the left cushion unit 101 can be enhanced.

The suspension structure of the present invention is preferably applicable to a motorcycle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A suspension structure, comprising:
   paired first and second cushion units disposed on opposite sides of a steering stem, in a vehicle width direction,
   said first cushion unit comprising a compression coil spring for alleviating vibrations and shocks and a first damper for damping vibrations and shocks, said compression coil spring extending between a lower tube of said first cushion unit and an axle support portion of a vehicle,
   said second cushion unit comprising a second damper having an outer diameter smaller than an outer diameter of said compression coil spring in said first cushion unit and larger than an outer diameter of said first damper in said first cushion unit,
   wherein said second cushion does not include a compression coil spring extending between a lower tube of said second cushion unit and the axle support portion of the vehicle,
   wherein said first and second cushion units are connected to each other by a top bridge and a bottom bridge, said first cushion unit, said second cushion unit, said top bridge and said bottom bridge cumulatively forming a front fork,
   wherein said front fork is steerably supported on a vehicle body,
   wherein an outer diameter of an upper fitting of said first cushion unit, supported on said top bridge, and an outer diameter of an upper fitting of said second cushion unit, supported on said top bridge, are different from each other,
   wherein an outer diameter of a lower fitting of said first cushion unit, supported on said top bridge, and an outer diameter of a lower fitting of said second cushion unit, supported on said top bridge, are different from each other.

2. The suspension structure according to claim 1, wherein said second cushion unit includes a caliper bracket mounted to a brake caliper, said brake caliper being a component of a disc brake.

3. The suspension structure according to claim 2,
   wherein the outer diameter of said upper fitting of said first cushion unit, supported on said top bridge, and the outer diameter of said lower fitting of said first cushion unit, supported on said bottom bridge, are different from each other, and
   wherein the outer diameter of said upper fitting of said second cushion unit, supported on said top bridge, and the outer diameter of said lower fitting of said second cushion unit, supported on said bottom bridge, are different from each other.

4. The suspension structure according to claim 3, wherein an outer diameter of said outer tube of said second cushion unit is gradually increased from said upper fitting of said second cushion unit to said lower fitting of said second cushion unit to a lower end of said outer tube of said second cushion unit in a tapered shape.

5. The suspension structure according to claim 2, wherein an outer diameter of said outer tube of said second cushion unit is gradually increased from said upper fitting of said second cushion unit to said lower fitting of said second cushion unit to a lower end of said outer tube of said second cushion unit in a tapered shape.

6. The suspension structure according to claim 1,
   wherein the outer diameter of said upper fitting of said first cushion unit, supported on said top bridge, and the outer diameter of said lower fitting of said first cushion unit, supported on said bottom bridge, are different from each other, and
   wherein the outer diameter of said upper fitting of said second cushion unit, supported on said top bridge, and the outer diameter of said lower fitting of said second cushion unit, supported on said bottom bridge, are different from each other.

7. The suspension structure according to claim 6, wherein an outer diameter of said outer tube of said second cushion unit is gradually increased from said upper fitting of said second cushion unit to said lower fitting of said second cushion unit to a lower end of said outer tube of said second cushion unit in a tapered shape.

8. The suspension structure according to claim 1, wherein an outer diameter of said outer tube of said second cushion unit is gradually increased from said upper fitting of said second cushion unit to said lower fitting of said second cushion unit to a lower end of said outer tube of said second cushion unit in a tapered shape.

* * * * *